(12) United States Patent
Wang et al.

(10) Patent No.: US 8,403,610 B2
(45) Date of Patent: Mar. 26, 2013

(54) FASTENER

(75) Inventors: Kai-Gui Wang, Shenzhen (CN);
 Kok-Kan Chan, Santa Clara, CA (US);
 Hua-Lin Lv, Shenzhen (CN); Yu Zou,
 Shenzhen (CN)

(73) Assignees: **Hong Fu Jin Precision Industry
 (ShenZhen) Co., Ltd.**, Shenzhen (CN);
 Hon Hai Precision Industry Co., Ltd.,
 New Taipei (TW)

( * ) Notice: Subject to any disclaimer, the term of this patent is extended or adjusted under 35 U.S.C. 154(b) by 349 days.

(21) Appl. No.: 12/792,708

(22) Filed: Jun. 2, 2010

(65) Prior Publication Data

US 2011/0222986 A1 Sep. 15, 2011

(30) Foreign Application Priority Data

Mar. 12, 2010 (CN) .......................... 2010 1 0123223

(51) Int. Cl.
 *F16B 13/06* (2006.01)

(52) U.S. Cl. ............................ 411/45; 411/15; 411/344

(58) Field of Classification Search .................... 411/15,
 411/41, 45–48, 337, 344, 349, 549, 553
 See application file for complete search history.

(56) References Cited

U.S. PATENT DOCUMENTS

| | | | |
|---|---|---|---|
| 985,761 A * | 2/1911 | Ogden | 411/15 |
| 2,542,144 A * | 2/1951 | Kearns | 411/41 |
| 3,728,761 A * | 4/1973 | Holly | 411/80.1 |
| 4,263,833 A * | 4/1981 | Loudin et al. | 411/41 |
| 4,405,272 A * | 9/1983 | Wollar | 411/41 |
| 4,426,181 A * | 1/1984 | Omata | 411/33 |
| 4,478,545 A * | 10/1984 | Mizusawa et al. | 411/80.1 |
| 4,878,791 A * | 11/1989 | Kurihara et al. | 411/55 |
| 5,259,689 A * | 11/1993 | Arand et al. | 403/337 |
| 5,945,606 A * | 8/1999 | Tokunaga et al. | 73/756 |
| 6,174,118 B1 * | 1/2001 | Rebers et al. | 411/352 |
| 6,355,044 B1 * | 3/2002 | Hair | 606/326 |
| 6,514,023 B2 * | 2/2003 | Moerke | 411/45 |
| 7,993,085 B2 * | 8/2011 | McClure | 411/55 |
| 2007/0253794 A1 * | 11/2007 | Zhang et al. | 411/45 |
| 2008/0056840 A1 * | 3/2008 | Hitchcock | 411/45 |

* cited by examiner

*Primary Examiner* — Victor Batson
*Assistant Examiner* — Tyler Johnson
(74) *Attorney, Agent, or Firm* — Altis Law Group, Inc.

(57) ABSTRACT

A fastener includes a sleeve and a rod received in the sleeve. The sleeve includes a top end including at least one outer flange extending radially outward therefrom and at least one inner flange extending radially inward therefrom and a lower end including at least one spring tab. At least one spring tab comprises an outer flange at its end that extends radially outward. the sleeve is inserted into the receiving holes of the top article and the bottom article until the outer flange of the top end rests on the top plate, the rod is then pressed to move to drive at least one spring tab to deflect outwardly until the outer flange of at least one spring tab is held in contact with the bottom plate.

7 Claims, 5 Drawing Sheets

FASTENER

BACKGROUND

1. Technical Field

The present disclosure relates to fasteners and, particularly, to a fastener which can be manually operated.

2. Description of Related Art

The use of a fastener to allow two separate articles to be operatively engaged is known. An auxiliary tool such as screwdriver is usually used to fasten/loosen a fastener. When there is no screwdriver at hand, a user may not be able to operate the fastener.

Therefore, what is needed is a fastener which can be manually operated to overcome the described shortcoming.

DETAILED DESCRIPTION

Figure 1:
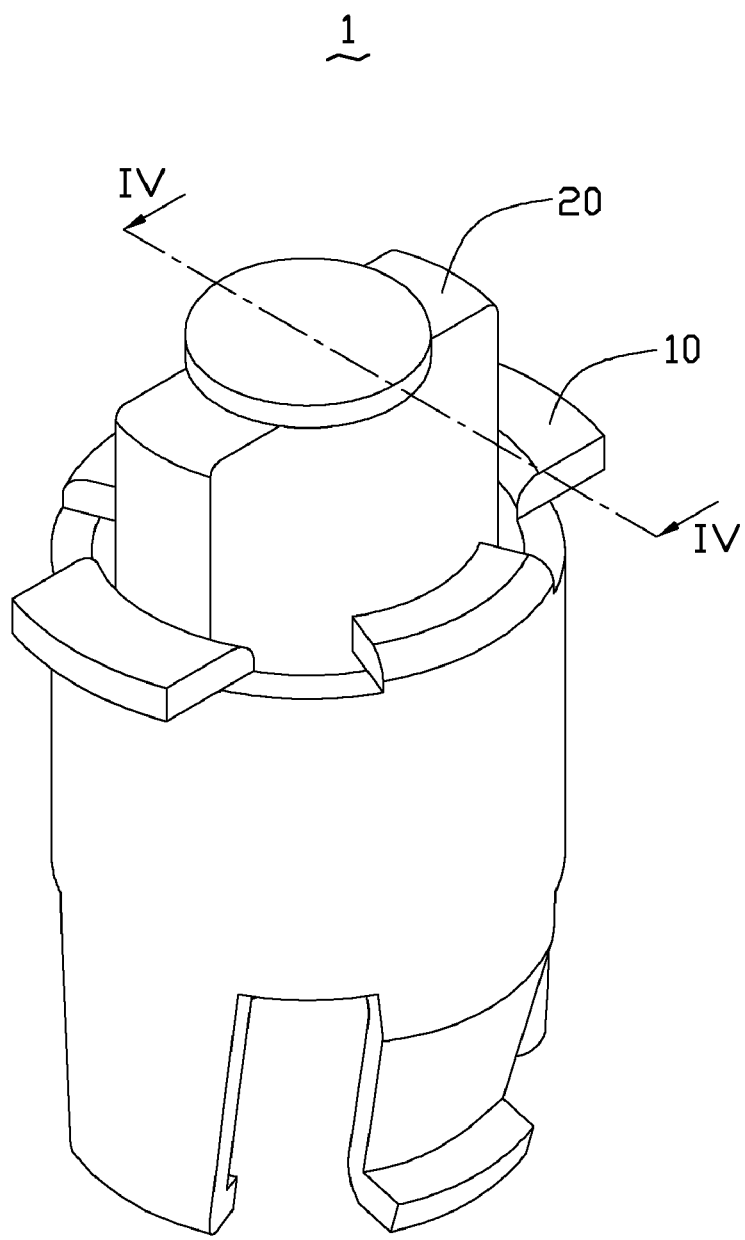
FIG. 1 is an isometric view of a fastener capable of connecting two plates together in accordance with an exemplary embodiment.
Figure 2:
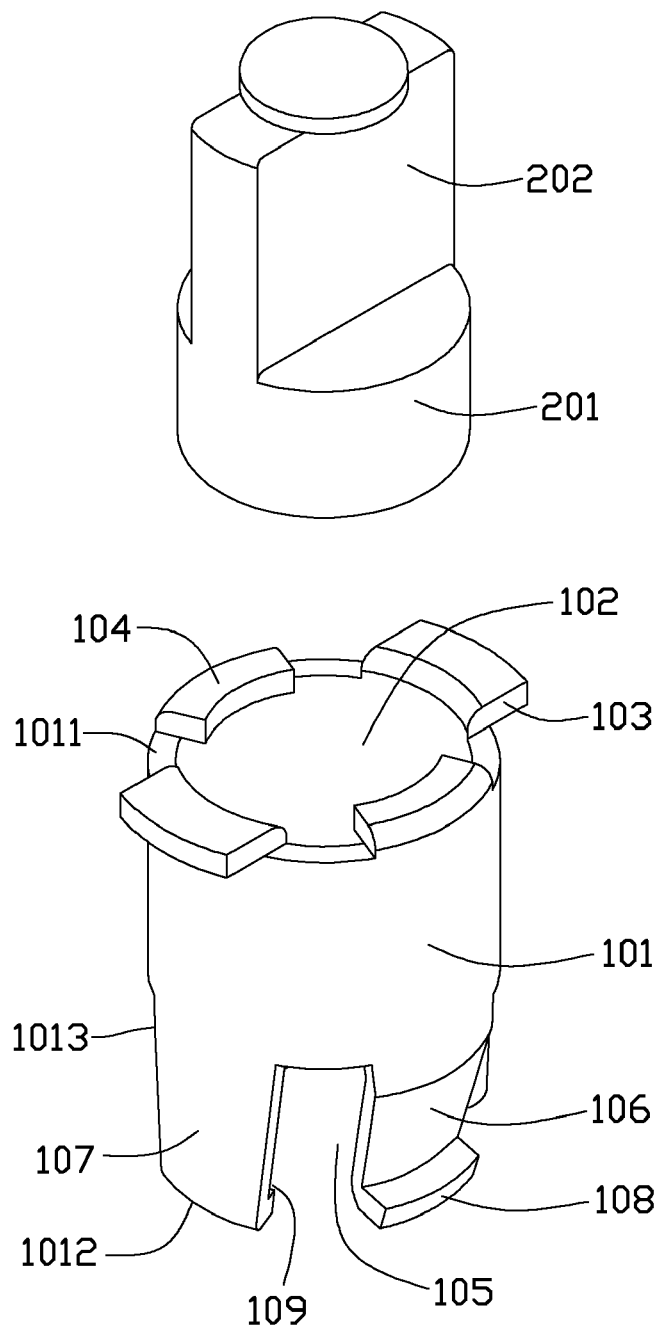
FIG. 2 is an exploded view of the fastener of FIG. 1.

Referring to FIGS. 1 and 2, a fastener 1 is provided. The fastener 1 includes a sleeve 10 and a rod 20 received in the sleeve 10. The sleeve 10 includes a main body 101 including a top end 1011 and a lower end 1012.

The top end 1011 includes two outer flanges 102 extending radially outward therefrom and two inner flanges 104 extending radially inward therefrom. In an alternative embodiment, the outer flanges 102 and the inner flanges 104 may be one or more according to need. The two outer flanges 102 are opposite to each other, and the inner flanges 104 are opposite to each other.

At least two opening 105 are defined in a lateral surface 1013 of the main body 101. Each of the at least one opening 105 is substantially rectangular. The openings 105 are configured for dividing the main body 101 adjacent to the lower end 1012 into a support portion 107 and a spring tab 106. In the embodiment, the number of at least two opening 105 is four. The number of the support portion 107 and the spring tab 106 is two, respectively. The two support portions 107 are opposite to each other. The two spring tabs 106 are opposite to each other. In another embodiment, the number of the opening 105 is not limited and may be changed as needed or desired.

Each support portion 107 includes an inner flange 109 at its end that extends radially inward. Each spring tab 106 is angled inwardly relative to the lateral surface 1013 of the main body 101. The spring tab 106 includes an outer flange 108 at its end that extends radially outward.

The rod 20 includes a base 201 and a handle 202 protruding from the base 201. The base 201 is substantially cylindrical to fit into the sleeve 10. The handle 202 is rectangular, allowing a user to more easily grasp and rotate the handle 202.

Figure 3:
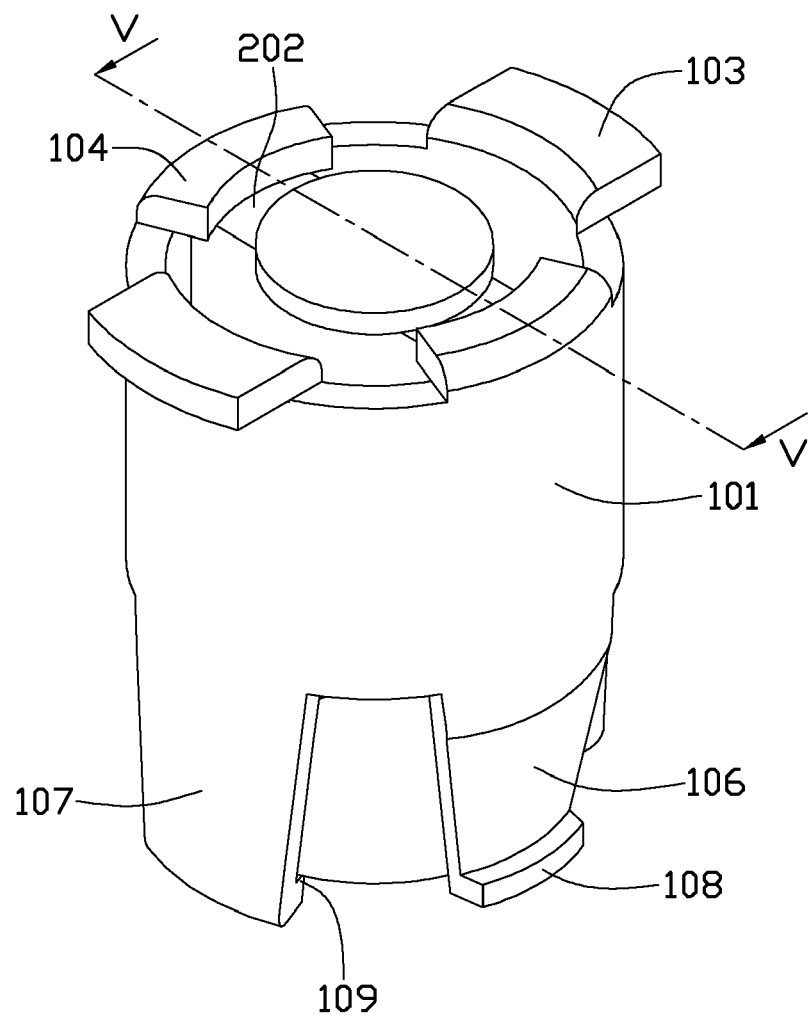
FIG. 3 is similar to FIG. 1, but showing that a rod has been inserted in a sleeve of the fastener of FIG. 1.
Figure 4:
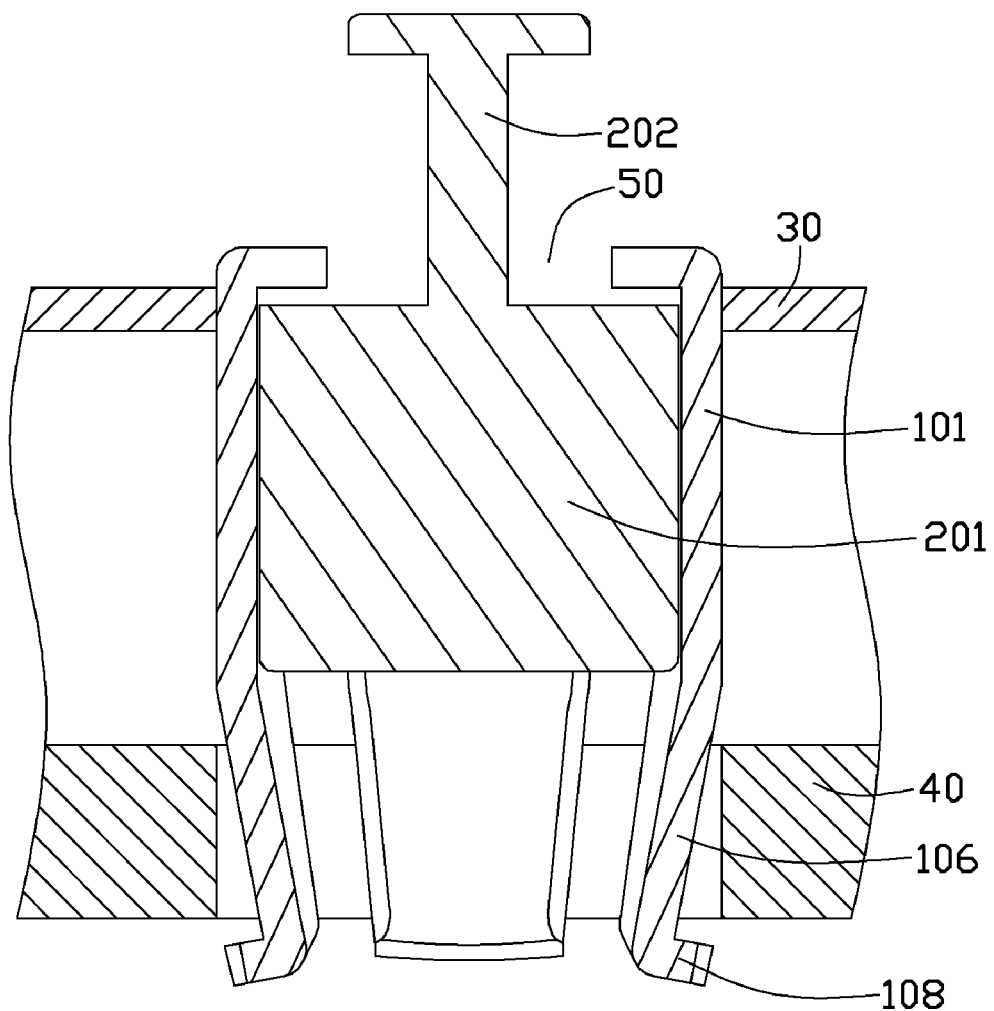
FIG. 4 is a cross-sectional view of the fastener of FIG. 1, take along lines IV-IV of FIG. 1.
Figure 5:
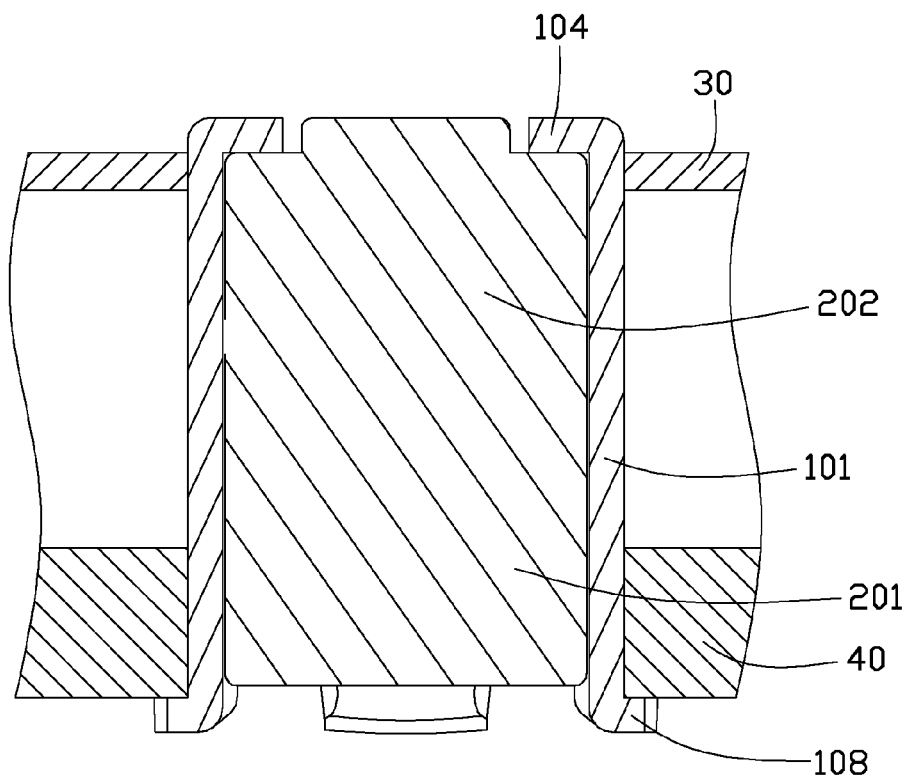
FIG. 5 is a cross-sectional view of the fastener of FIG. 3, take along lines V-V of FIG. 3.

Referring to FIGS. 3-5, to connect a top plate 30 to a lower plate 40, the sleeve 10 is inserted into a hole 50 defined through both the top plate 30 and the lower plate 40. The outer flange 103 rests on the top surface of the top plate 30. The rod 20 is then pressed to move toward the end 1012. During the movement of the base 201, the spring tabs 106 are driven to deflect outwardly. Once the base 201 is stopped by the inner flanges 109, the spring tabs 106 are deflected to positions where the outer flange 108 is held in contact with the lower plate 40. The outer flanges 103 and 108 keep the top plate 30 and the bottom plate 40 together. After the top plate 30 and the lower plate 40 are limited between the outer flange 103 and the outer flange 108, the handle 202 is forced by the user to rotate along the inner surface of the main body 101 until the top surface of the handle 202 resists the inner flange 104, thereby preventing the base 201 from moving upward by the elastic force from the spring tabs 106.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A fastener for connecting a top article and a bottom article together, the top article and the bottom article each defining a hole, the fastener comprising:
   a sleeve comprising:
      a top end comprising at least one outer flange extending radially outward therefrom and at least one inner flange extending radially inward therefrom; and
      a lower end comprising at least one spring tab angled inwardly relative to a lateral surface of the sleeve, each of the at least one spring tab comprising an end defining an outer flange extending radially outward therefrom;
   a rod received in the sleeve, the rod comprising a base and a handle protruding from the base;
   wherein, to connect the top article and the bottom article together, the sleeve is inserted into the holes of the top article and the bottom article until the outer flange of the top end rests on the top plate, the rod is then pressed to move toward the lower end to drive the at least one spring tab to deflect outwardly until the outer flange of each of at least one spring tab is held in contact with the bottom plate, after the top article and the bottom article are limited between the outer flange of the top end and the outer flange of each of at least one spring tab, the handle is rotated to a position where the top surface of the handle resists against the inner flange of the top end, thereby preventing the base from moving upward by the elastic force from the spring tabs.

2. The fastener as described in claim 1, wherein at least two opening are defined in the lateral surface of the sleeve, and are configured for dividing the sleeve adjacent to the lower end into a support portion and the at least one spring tab, the support portion defines an inner flange at its end that extends radially inward, the inner flange is configured for resisting the rod when the rod is moved to the lower end of the sleeve.

3. The fastener as described in claim 2, wherein the number of at least two opening is four.

4. The fastener as described in claim 3, wherein the number of at least one spring tab is two.

5. The fastener as described in claim 1, wherein the rod comprises a base and a handle protruding from a top surface of the base, the base is substantially cylindrical to fit into the sleeve, and the handle is rectangular, allowing a user to grasp and rotate the handle.

6. The fastener as described in claim 1, wherein the number of the at least one outer flange and the number of the at least one inner flange of the top end are two, respectively.

7. The fastener as described in claim 6, wherein the two outer flanges are opposite to each other and the two inner flanges are opposite to each other.

* * * * *